United States Patent
Payne

[15] 3,703,703
[45] Nov. 21, 1972

[54] VEHICLE THEFT SIGNALLING DEVICE

[72] Inventor: Sumas Payne, 8522 South Maryland Avenue, Chicago, Ill. 60619

[22] Filed: Jan. 3, 1972

[21] Appl. No.: 214,891

Related U.S. Application Data

[63] Continuation of Ser. No. 48,982, Jan. 24, 1970, abandoned.

[52] U.S. Cl. ................................. 340/63, 340/416
[51] Int. Cl. ............................................ B60r 25/10
[58] Field of Search ............ 340/63, 64, 65, 416, 224; 200/61.25, 61.22

[56] References Cited

UNITED STATES PATENTS 3,461,423  8/1969  Trumble ............... 340/244 X

*Primary Examiner*—Alvin H. Waring
*Attorney*—Robert H. Heise

[57] ABSTRACT

A crime prevention device comprising a vehicle dome light with a signal transmitting device which is actuated by tampering of the ignition, application of brakes or starter mechanism coupled with a locking system for locking the doors and windows of the vehicle to trap the thief. The signal transmitter is tuned to a wrist-carried bracelet receiver unit which has a light signal which is responsive to the transmission of signals from the transmitter. The bracelet unit is adapted to be manually actuated to light, for alerting the police force of impending criminal activity.

5 Claims, 9 Drawing Figures

PATENTED NOV 21 1972 3,703,703
SHEET 1 OF 2
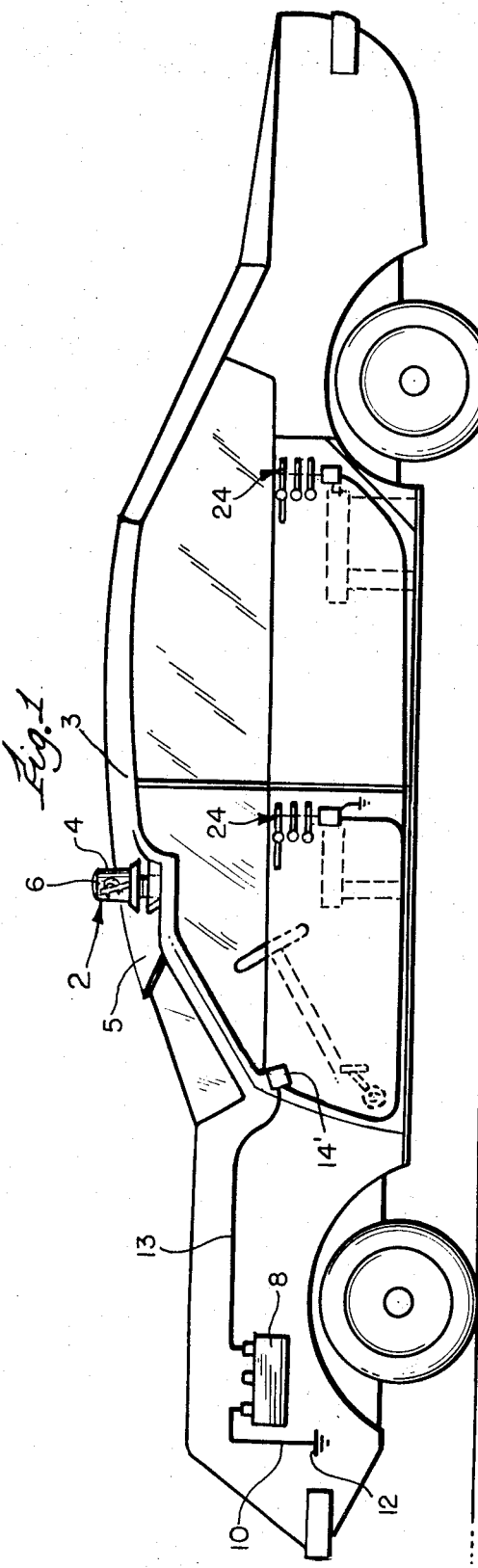
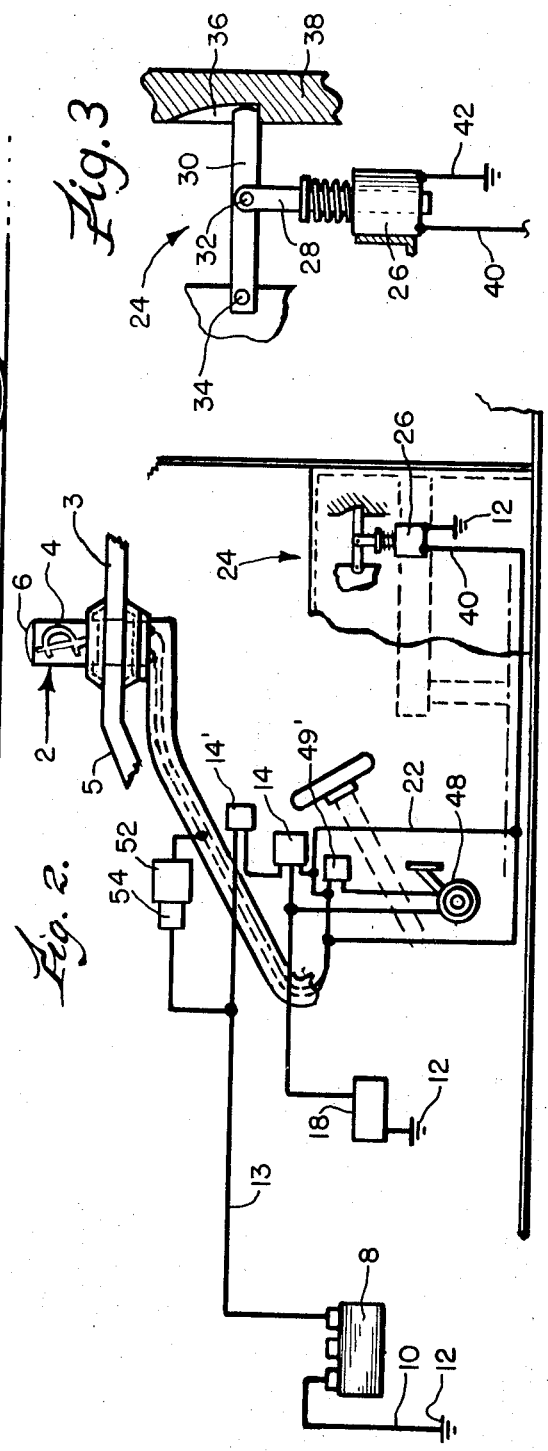

PATENTED NOV 21 1972    3,703,703
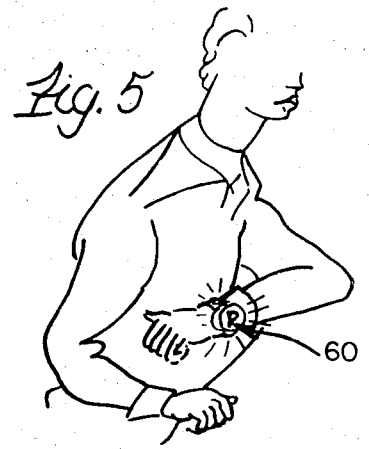
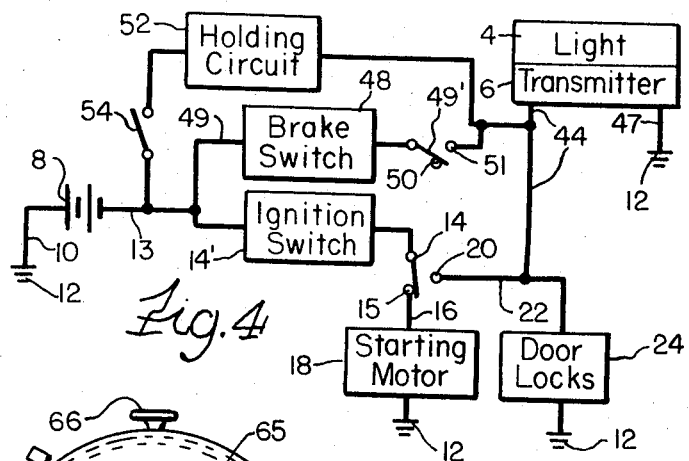
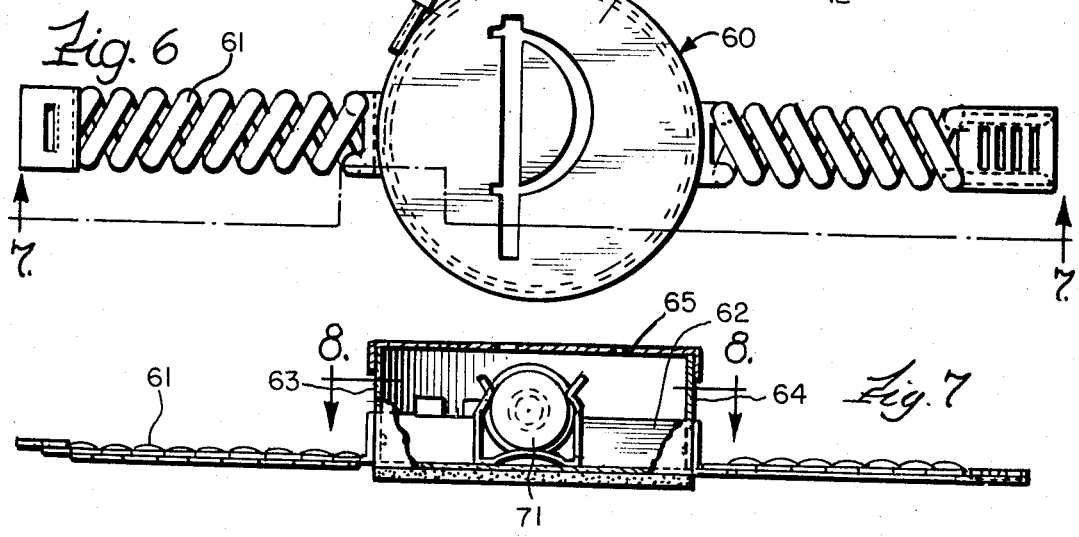
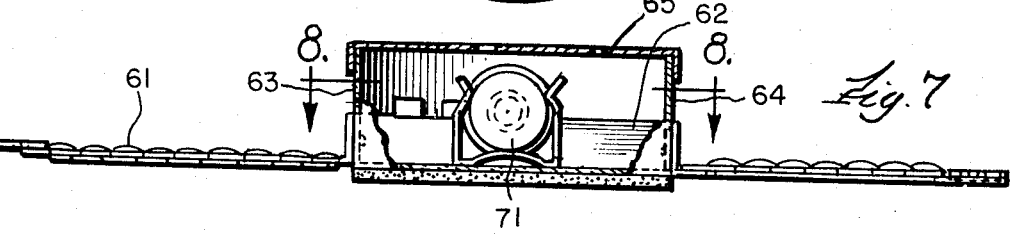
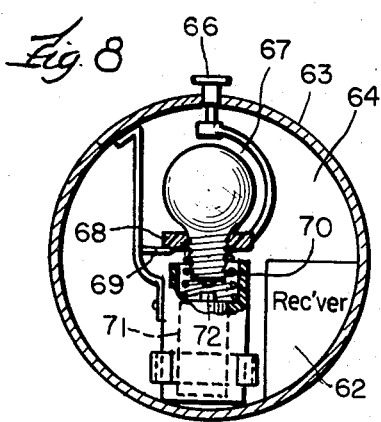
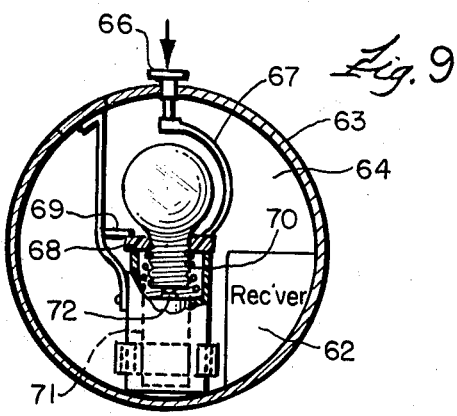

VEHICLE THEFT SIGNALLING DEVICE

RELATED APPLICATIONS

This application is a continuation of my application Ser. No. 48,982 filed June 24, 1970, and now abandoned.

DISCUSSION OF THE PRIOR ART

To the best of my knowledge, I am not aware of any devices in which the vehicle is automatically conditioned to give alarm of an impeding theft while the criminal is in the act of stealing the vehicle and which incorporates apparatus for trapping the thief and in which the signaling device in addition to being visible to the general public also signals the owner or user of the receiver of the theft taking place.

SUMMARY OF THE INVENTION

This invention is directed to apparatus for protecting vehicles against theft, pilferage, vandalism and wherein the counterpart receiver is useful as a separate signaling device.

A general object is to provide a novel apparatus which is of simple construction and effective in a limited range of alerting the owner as well as the police of the criminal activity.

A still further object is to provide a novel apparatus which comprises a circuit through the automobile battery the circuit being conditioned to actuate a signaling device by completing a circuit through various operating components of the vehicle, such as the brakes, ignition or steering mechanism.

The principal object of this invention is to provide a virtually theft proof vehicle.

A further object is to devise a novel apparatus which may be used conjunctively or separately as anti-theft or crime prevention devices.

These and other objects and advantages inherent in and encompassed by the invention will become more readily apparent from the specifications and the drawings, wherein:

FIG. 1 is a side elevational view of a vehicle equipped with my novel apparatus;

FIG. 2 is an enlarged diagrammatic view of the circuit for operating the apparatus;

FIG. 3 is a fragmentary view of the door locking mechanism;

FIG. 4 is a schematic diagram of the circuit for operating various components of the vehicle and the signaling device;

FIG. 5 illustrates the combination receiver and personal signal unit shown carried by the user;

FIG. 6 is an enlarged plan view of the unit;

FIG. 7 is a cross sectional view thereof taken substantially on line 7—7 of FIG. 6;

FIG. 8 is a sectional view taken on line 8—8 of FIG. 6 with the light extinguished; and FIG. 9 is a section similar to FIG. 8, showing the light manually switched on.

DESCRIPTION OF THE INVENTION

The novel security device generally indicated 2 is shown in association with a vehicle 3 and comprises a dome light 4 suitably mounted in the vehicle roof structure 5.

The light is coupled with a suitable noise and radio transmitter 6 which is adapted to send out a signal on an approved wave length for a controlled limited distance and may be in the nature of signal sources such as well known in garage door openers.

Referring now to FIG. 4 it will be seen that the circuit comprises a battery 8 which has one lead 10 connected to ground 12, such as the car body, and the other lead 13 is connected to the ignition switch 14' which is connected through a single pole double throw switch 14 by the lawful operator or owner through contact 15 and lead 16 to the starter motor 18 which is connected to ground 12. Thus the vehicle may be started without activating the security devices.

When the operator or owner leaves the vehicle he would activate the security system by throwing switch 14 to close with contact 20 which through lead 22 is connected to the door locks 24 each of which may comprise a solenoid 26 with a spring actuated core 28 connected to latch 30 at 32 and biasing the latch 30 upwardly about pivot 34, which is anchored to any brace of an associated door, out of the catch 36 which is provided in the door jamb 38. The lead 22 is connected to one lead 40 of solenoid 26 and the other lead 42 of solenoid 26 is connected to ground 12.

Simultaneously lead 22 is connected to one lead 44 of the transmitter 6 and the light 4 which are grounded by lead 47.

As seen in FIG. 4 the battery lead 12 may be connected to the brake switch 48 which through lead 49 is connectable by switch 49' either to ground 12 when switch 49' engages contact 50 or with the light and transmitter when the switch is placed in engagement with contact 51.

A holding circuit 52 may be provided between leads 12 and 22 which would transmit the current therebetween even though contact through the ignition or brake switch would be terminated. Such holding circuits are well known and may be deactivated by opening switch 54.

It will be realized that switches 54, 14' and 49 may be operated by a common control in order to activate the security system or to turn it off.

The wrist alarm generally designated 60 may comprise an expansion bracelet 61 which may serve as the antenna for the receiver 62, mounted in a case 63.

The case 63 may have a metallic bottom portion 64 capped by a lens 65. In the periphery of the portion 64 a button 66 may be provided which can be depressed to move arm 67 connected thereto inwardly. The arm 67 is connected to a dielectric bulb mounting 68 and moves with the bulb and arm pursuant to the button 66 being moved in and out of the casing.

The inward movement of the button 66 displaces the mounting 68 behind the flexible stop 69 as seen in FIG. 8 and compresses the spring 70 which has contact with the negative casing of the battery 71. The conical spring is threaded upon the base of the bulb which has a center contact engaged with the positive pole 72 of the battery.

Outward movement of the button 66 expands the spring and displaces the holder outwardly of the stop 69 as seen in FIG. 7.

The receiver may be suitably coupled to the battery by rotating the button 66 to close a suitable switch well known whereby upon the signal being generated by the transmitter, the receiver is energized and closes the circuit of the light with the battery or may provide an audible signal as desired.

A preferred embodiment of the invention has been disclosed. It will be appreciated that various forms of the invention will become apparent in view of this disclosure which is not intended by way of limitation and the scope of coverage is only to be gauged by the nature of the appended claims:

I claim:

1. A security apparatus for person and vehicle comprising switch controlled vehicular operator components including at least a brake assembly, a source of electrical potential carried on the vehicle, signal generating means on the vehicle, switch means operatively connected to each component and having a first position accommodating normal operation of said component for vehicular operation and having a second position operatively coupling the respective component upon actuation of such component with said signal means in a closed circuit continuity through said source of electric potential for energizing said signal means attendant to operation of such component by unauthorized personnel, by-pass holding means for maintaining the circuit closed upon discontinuance of operation of such component, receiver means adapted to be carried by a person, said receiver means having a circuit tuned for receiving signals from said signal source for signalling and thereby alerting such persons to attempted and unauthorized operation of the vehicle, said receiver means comprising a wrist mountable unit including a wrist-embracing bracelet and antenna combination for said receiver, a receiver housing case connected to said bracket, signal light means in said case, and means for selectively operating said light in conjunction with said receiver means and independently thereof.

2. The invention according to claim 1 and means for coupling said components to said signal generating means, and means for locking the vehicle doors and windows attendant to said actuation of the signal generating means.

3. The invention according to claim 1 and said signal generating means including a lamp and means for flashing the same.

4. The invention according to claim 1 and said signal generating means including means for producing an audible signal.

5. The invention according to claim 1 and another of said components comprising a steering wheel lock, and means for locking said steering wheel lock attendant to unauthorized operation of the vehicle as aforesaid.

* * * * *